United States Patent
Seydoux et al.

(10) Patent No.: US 7,612,565 B2
(45) Date of Patent: *Nov. 3, 2009

(54) APPARATUS AND SYSTEM FOR WELL PLACEMENT AND RESERVOIR CHARACTERIZATION

(75) Inventors: Jean Seydoux, Houston, TX (US); Emmanuel Legendre, Houston, TX (US); Reza Taherian, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/204,996

(22) Filed: Sep. 5, 2008

(65) Prior Publication Data

US 2008/0315882 A1      Dec. 25, 2008

Related U.S. Application Data

(63) Continuation of application No. 11/160,533, filed on Jun. 28, 2005.

(51) Int. Cl.
*G01V 3/00* (2006.01)
(52) U.S. Cl. ..................................... 324/334
(58) Field of Classification Search ......... 324/338–343, 324/345–346, 334; 702/7, 11; 175/40, 45, 175/50
See application file for complete search history.

(56) References Cited

U.S. PATENT DOCUMENTS

| | | |
|---|---|---|
| 4,739,325 A | 4/1988 | MacLeod |
| 5,117,927 A | 6/1992 | Askew |
| 5,661,402 A | 8/1997 | Chesnutt et al. |
| 5,955,884 A | 9/1999 | Payton et al. |
| 6,057,784 A | 5/2000 | Schaaf et al. |

(Continued)

FOREIGN PATENT DOCUMENTS

EP      012009      6/1980

(Continued)

OTHER PUBLICATIONS

Machetin et al., "TEMP—a New Dual-Electromagnetic and Laterology Apparatus-Tech. Complex," 13th European Formation Evaluation Sym. Trans., Budapest Ch. SPWLA, Paper K (1990).

(Continued)

*Primary Examiner*—Renee Aurora
(74) *Attorney, Agent, or Firm*—Darla Fonseca; Brigitte L. Echols; Dale V. Gaudier

(57) ABSTRACT

A resistivity array having a modular design includes a transmitter module with at least one antenna, wherein the transmitter module has connectors on both ends adapted to connect with other downhole tools; and a receiver module with at least one antenna, wherein the transmitter module has connectors on both ends adapted to connect with other downhole tools; and wherein the transmitter module and the receiver module are spaced apart on a drill string and separated by at least one downhole tool. Each transmitter and receiver module may comprise at least one antenna coil with a magnetic moment orientation not limited to the tool longitudinal direction. A spacing between the transmitter and receiver module may be selected based on expected reservoir thickness.

32 Claims, 12 Drawing Sheets

U.S. PATENT DOCUMENTS

| | | |
|---|---|---|
| 6,181,138 B1 | 1/2001 | Hagiwara et al. |
| 6,188,222 B1 | 2/2001 | Seydoux et al. |
| 6,294,917 B1 | 9/2001 | Nichols |
| 6,480,000 B1 | 11/2002 | Kong et al. |
| 6,525,540 B1 | 2/2003 | Kong et al. |
| 6,556,014 B1 | 4/2003 | Kong et al. |
| 6,594,584 B1 | 7/2003 | Omeragic et al. |
| 6,646,441 B2 | 11/2003 | Thompson et al. |
| 6,656,014 B2 | 12/2003 | Aulson |
| 6,958,610 B2 | 10/2005 | Gianzero |
| 6,969,994 B2 | 11/2005 | Minerbo et al. |
| 6,998,844 B2 * | 2/2006 | Omeragic et al. ........... 324/343 |
| 7,093,672 B2 | 8/2006 | Seydoux et al. |
| 2003/0016020 A1 | 1/2003 | Gianzero |
| 2003/0085707 A1 | 5/2003 | Minerbo et al. |
| 2006/0011385 A1 | 1/2006 | Seydoux et al. |

FOREIGN PATENT DOCUMENTS

| | | |
|---|---|---|
| RU | 817648 | 3/1981 |
| RU | 960701 | 4/1981 |
| RU | 998995 | 2/1983 |
| RU | 1004940 | 5/1983 |
| RU | 2069878 | 11/1996 |
| RU | 2107313 | 3/1998 |
| SU | 1246035 | 7/1986 |

OTHER PUBLICATIONS

Korolev et al., "Electromagnetic Logging by a Lateral Magnetic Dipole, Perspectives of Electromagnetic Well Scanning," Geofizika Scientific-Production Co. RU (1995).

"Double Electromagnetic and Lateral Logging," Methodical Handbook, Moscow, Nedra RU (1991).

* cited by examiner

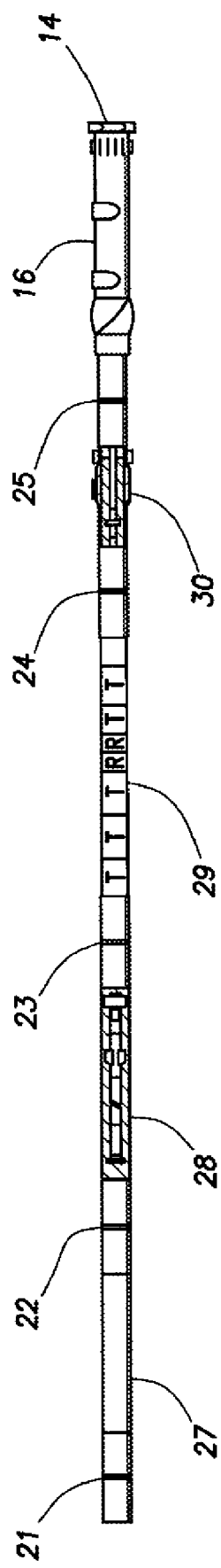
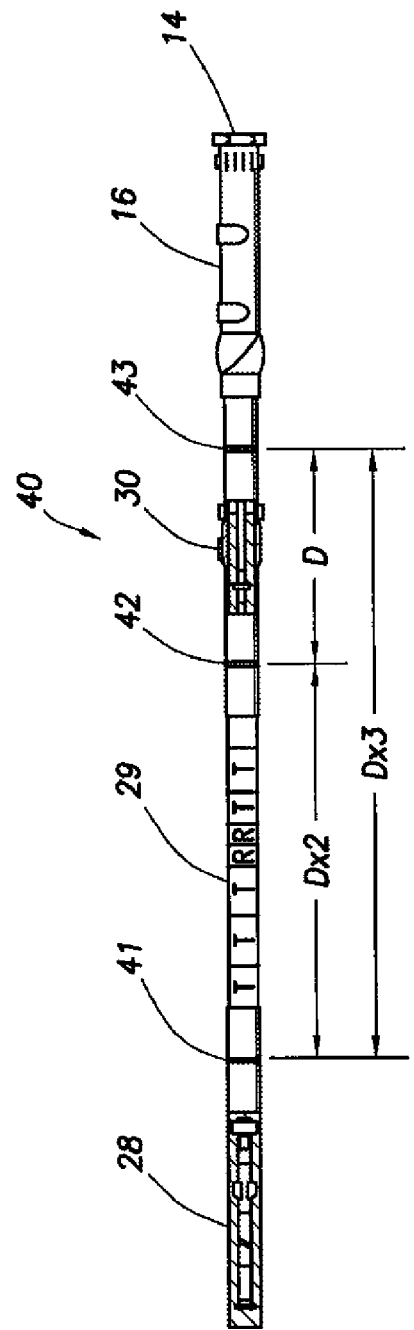
FIG.2
FIG.3

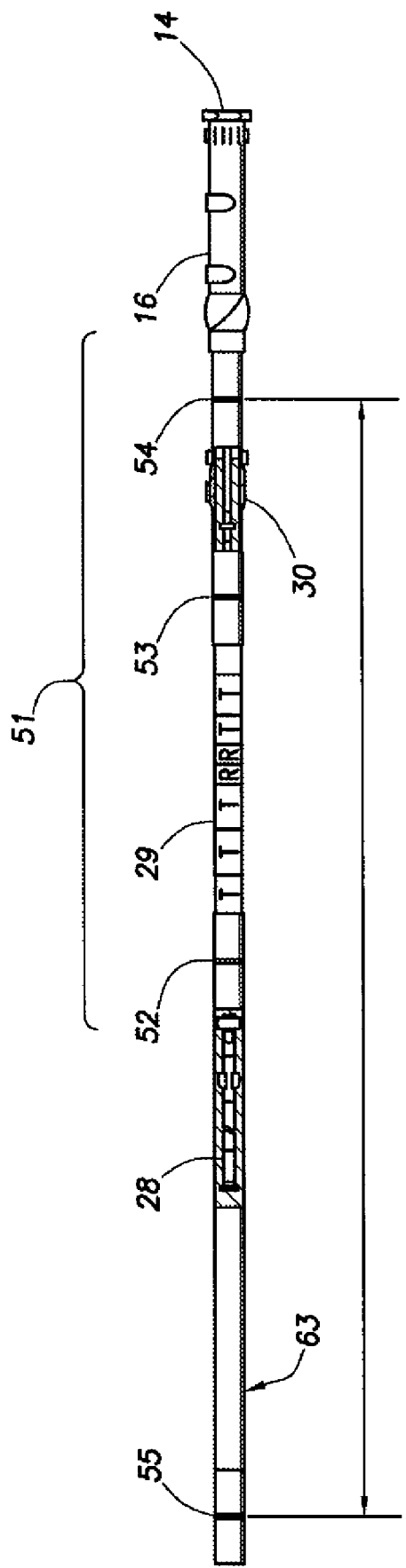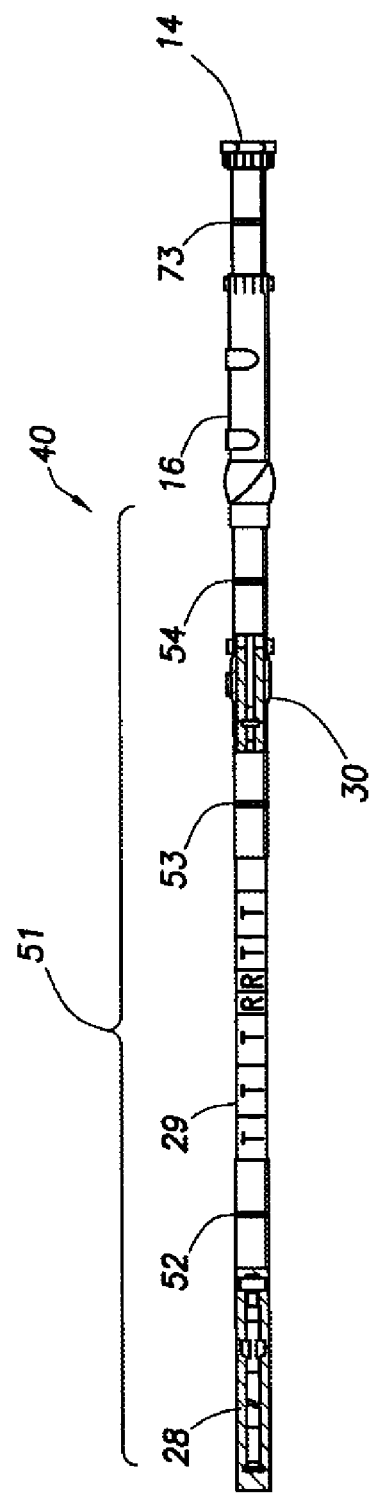

APPARATUS AND SYSTEM FOR WELL PLACEMENT AND RESERVOIR CHARACTERIZATION

CROSS-REFERENCE TO RELATED APPLICATIONS

This continuation application claims the benefit, under 35 U.S.C. § 120, of U.S. application Ser. No. 11/160,533, filed on Jun. 28, 2005, which claims the benefit, under 35 U.S.C. § 119, of U.S. Provisional Application Ser. No. 60/587,689, filed on Jul. 14, 2004.

BACKGROUND

1. Field of the Invention

This invention relates to the field of subsurface exploration and, more particularly, to techniques for determining subsurface parameters and well placement. The invention has general application to the well logging art, but the invention is particularly useful in logging while drilling (LWD), measurement-while-drilling (MWD), and directional drilling (Geosteering) applications.

2. Background Art

Electromagnetic (EM) logging tools have been employed in the field of subsurface exploration for many years. These logging tools or instruments each have an elongated support equipped with antennas that are operable as sources (transmitters) or sensors (receivers). The antennas on these tools are generally formed as loops or coils of conductive wires. In operation, a transmitter antenna is energized by an alternating current to emit EM energy through the borehole fluid ("mud") and into the surrounding formations. The emitted energy interacts with the borehole and formation to produce signals that are detected and measured by one or more receiver antennas. The detected signals reflect the interactions with the mud and the formation. The measurements are also affected by mud filtrate invasion that changes the properties of the rock near the wellbore. By processing the detected signal data, a log or profile of the formation and/or borehole properties is determined.

The processing of the measured subsurface parameters is done through a process known as an inversion technique. Inversion processing generally includes making an initial estimate, or model, of the geometry of earth formations, and the properties of the formations, surrounding the well logging instrument. The initial model parameters may be derived in various ways known in the art. An expected logging instrument response is calculated based on the initial model. The calculated response is then compared with the measured response of the logging instrument. Differences between the calculated response and the measured response are used to adjust the parameters of the initial model. The adjusted model is used to again calculate an expected response of the well logging instrument. The expected response for the adjusted model is compared with the measured instrument response, and any difference between them is used to again adjust the model. This process is generally repeated until the differences between the expected response and the measured response fall below a pre-selected threshold. U.S. Pat. No. 6,594,584 describes modern inversion techniques and is incorporated herein by reference in its entirety.

Well placement in real-time using resistivity measurements has been used by the industry since the availability of LWD and MWD tools. This application is commonly known as geo-steering. In geosteering, estimation of the borehole position in real-time with respect to known geological markers is performed through correlation of resistivity log features. Because of the typical close placement of the resistivity sensors of a LWD tool along the drill collar, only limited radial sensitivity is attained, thereby limiting the extent of the formation geological model knowledge and estimation. Only with the introduction of sensors with transmitter receiver distance in the tens of meters, a deeper radial sensitivity can be obtained.

Schlumberger's LWD Ultra Deep Resistivity (UDR) induction tool, with large transmitter receiver spacing in the tens of meters has been successfully tested. One application of the tool has been to determine the location of an oil-water contact (OWC) 7-11 m away from the well path. U.S. Pat. No. 6,188,222, titled "Method and Apparatus for Measuring Resistivity of an Earth Formation" and issued to Seydoux et al., and U.S. patent application Ser. No. 10/707,985, titled "Systems for Deep Resistivity While Drilling for Proactive Geosteering" by Seydoux et al., provide further description of these tools and use thereof. The '222 patent and the '985 application are assigned to the assignee of the present invention and are incorporated by reference in their entireties.

The LWD ultra deep resistivity basic tool configuration comprises two independent drilling subs (one transmitter and one receiver) that are placed in a BHA among other drilling tools to allow large transmitter-receiver spacing. The basic measurements obtained with this tool consist of induction amplitudes at various frequencies, in order to allow detection of various formation layer boundaries with resistivity contrasts having a wide range of resistivities. The measurements are used to invert for an optimum parameterized formation model that gives the best fit between actual tool measurements and the expected measurements for the tool in such a formation model.

FIG. 1 shows an example of an MWD tool in use. In the configuration of FIG. 1, a drill string 10 generally includes kelly 8, lengths of drill pipe 11, and drill collars 12, as shown suspended in a borehole 13 that is drilled through an earth formation 9. A drill bit 14 at the lower end of the drill string is rotated by the drive shaft 15 connected to the drilling motor assembly 16. This motor is powered by drilling mud circulated down through the bore of the drill string 10 and back up to the surface via the borehole annulus 13a. The motor assembly 16 includes a power section (rotor/stator or turbine) that drives the drill bit and a bent housing 17 that establishes a small bend angle at its bend point which causes the borehole 13 to curve in the plane of the bend angle and gradually establish a new borehole inclination. The bent housing can be a fixed angle device, or it can be a surface adjustable assembly. The bent housing also can be a downhole adjustable assembly as disclosed in U.S. Pat. No. 5,117,927, which is incorporated herein by reference. Alternately, the motor assembly 16 can include a straight housing and can be used in association with a bent sub well known in the art and located in the drill string above the motor assembly 16 to provide the bend angle.

Above the motor assembly 16 in this drill string is a conventional MWD tool 18, which has sensors that measure various downhole parameters. Drilling, drill bit and earth formation parameters are the types of parameters measured by the MWD system. Drilling parameters include the direction and inclination of the BHA. Drill bit parameters include measurements such as weight on bit (WOB), torque on bit and drive shaft speed. Formation parameters include measurements such as natural gamma ray emission, resistivity of the formations, and other parameters that characterize the formation. Measurement signals, representative of these downhole parameters and characteristics, taken by the MWD system are telemetered to the surface by transmitters in real time or recorded in memory for use when the BHA is brought back to the surface.

Although the prior art deep-reading resistivity tools (such as UDR) proved to be invaluable in geosteering applications, there remains a need for further improved deep-reading resistivity tools that can be used in geosteering and/or other applications.

SUMMARY

One aspect of the invention relates to a resistivity array having a modular design. A resistivity array in accordance with one embodiment of the invention includes a transmitter module with at least one antenna, wherein the transmitter module has connectors on both ends adapted to connect with other downhole tools; and a receiver module with at least one antenna, wherein the transmitter module has connectors on both ends adapted to connect with other downhole tools; and wherein the transmitter module and the receiver module are spaced apart on a drill string and separated by at least one downhole tool. Each transmitter and receiver module may comprise at least one antenna coil with a magnetic moment orientation not limited to the tool longitudinal direction. In the case of more than one antenna, all antennas orientation vectors may be linearly independent. A set of vectors are linearly independent if and only if the matrix constructed from concatenating horizontally the vector's component has a rank equal to the number of vectors.

Another aspect of the invention relates to resistivity tools. A resistivity tool in accordance with one embodiment of the invention includes a tool body adapted to move in a borehole; and at least three modules (subs) disposed on the tool body, wherein the at least three modules are not equally spaced along a longitudinal axis of the tool body, such that a combination of the at least three modules comprises a resistivity array of different spacings.

Another aspect of the invention relate to resistivity tools. A resistivity tool in accordance with one embodiment of the invention includes a tool body adapted to move in a borehole; a resistivity sensor disposed on the tool body and comprising a plurality of modules forming at least one array; and an additional antenna disposed on the tool body and spaced apart from the resistivity sensor along a longitudinal axis of the tool body, wherein the additional module and one of the plurality of module in the resistivity sensor form an array having a spacing greater than about 90 feet.

Another aspect of the invention relates to logging-while-drilling tools. A logging-while-drilling tool in accordance with one embodiment of the invention includes a drill bit disposed at one end of a drill string; a first module disposed on the drill string proximate the drill bit or in the drill bit, and at least one additional module disposed on the drill string, and spaced apart from the first module, wherein the first module has at least one antenna with magnetic moment orientation not limited to the longitudinal direction, and wherein the at least one additional module comprises three antennas whose magnetic moment orientations are linearly independent.

Another aspect of the invention relates to methods for formation resistivity measurements. A method for formation resistivity measurements in accordance with one embodiment of the invention includes transmitting electromagnetic energy into a formation using a transmitter antenna in a resistivity array, wherein the transmitting is performed with a plurality of frequencies according to a selected pulse scheme; and detecting, for each of the plurality of frequencies, a signal induced in a receiver antenna spaced apart from the transmitter antenna in the resistivity array.

Another aspect of the invention relates to methods for designing a resistivity array. A method for designing a resistivity array in accordance with one embodiment of the invention includes estimating a thickness of a reservoir; and disposing a transmitter and a receiver on a drill string such that a spacing between the transmitter and the receiver is no less than the estimated thickness of the reservoir.

Other aspects of the invention will be apparent from the following description and the appended claims.

BRIEF DESCRIPTION OF DRAWINGS

FIG. 2 shows a resistivity array in accordance with one embodiment of the present invention.

FIG. 3 shows a resistivity array in accordance with another embodiment of the present invention.

FIG. 5 shows a resistivity array in accordance with one embodiment of the present invention.

FIG. 6 shows a resistivity array in accordance with one embodiment of the present invention.

DETAILED DESCRIPTION

Figure 1:
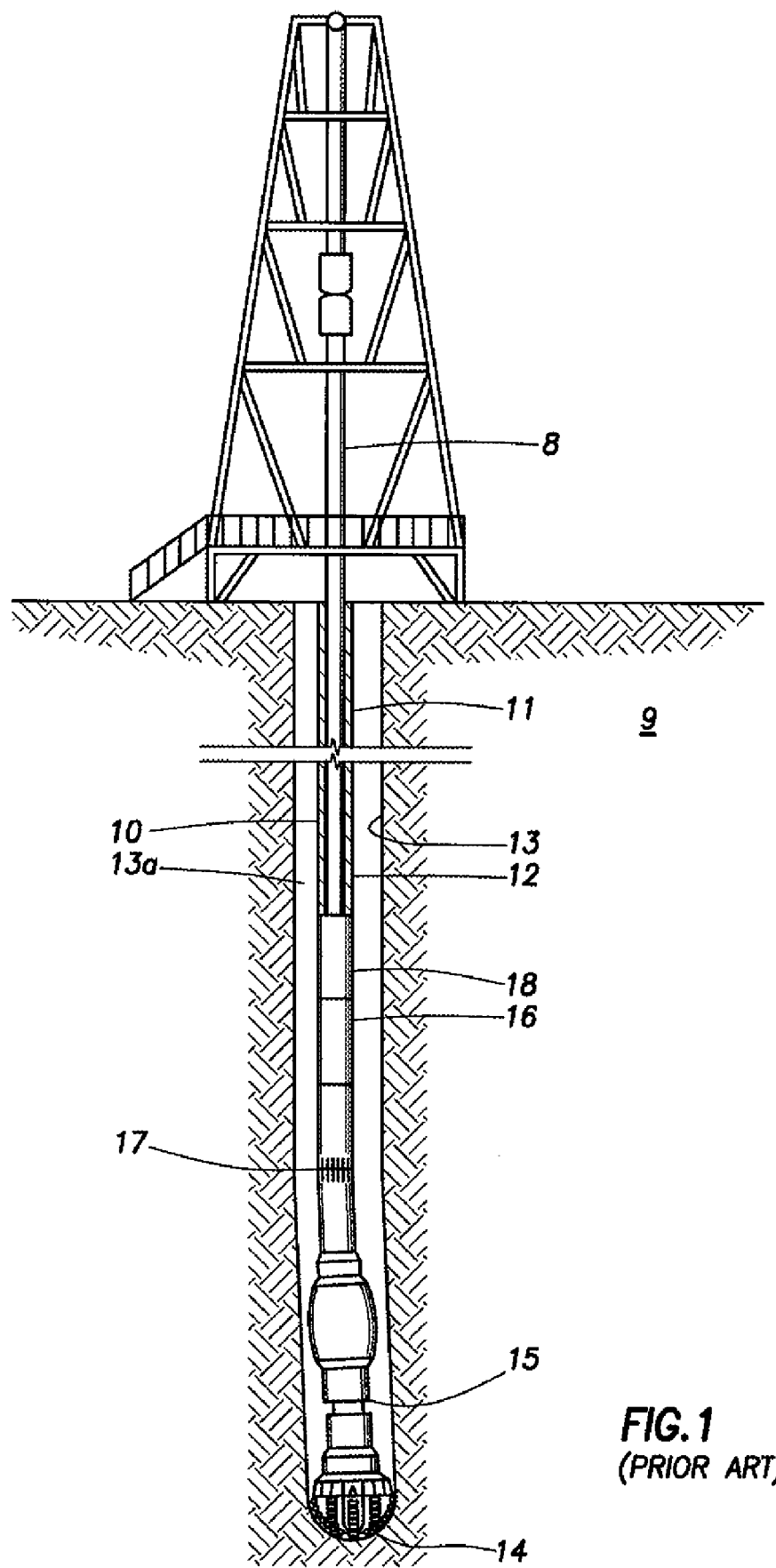
FIG. 1 shows a prior art drilling rig and drill string that can be used with one embodiment of the invention.

Embodiments of the invention relate to resistivity arrays having improved properties. Some embodiments of the invention relate to methods of using these tools in formation evaluation. Embodiments of the invention may permit inversion for more complicated formation models (i.e., formation model with more parameters) and/or may improve the robustness of resistivity measurement inversion (uncertainty reduction). Some embodiments of the invention may increase the flexibility of formation resistivity evaluation by providing more measurements, each of which may have different responses to different formation models.

Some embodiments of the invention provide resistivity arrays having a modular design. The modular design facilitates setting up different tool configurations for different measurement requirements. For example, by extending the number of transmitter, receiver combinations (for example, one embodiment with four transmitters and one receiver, forming four transmitter-receiver arrays), more depths of investigation can be obtained.

Some embodiments of the invention may include antennas that can function as a transceiver (i.e., as a transmitter and a receiver). This further provides tool configuration flexibility. In this implementation, for the same number of modules, a greater number of transmitter, receiver combinations can be achieved. Also, symmetrization of directional measurement can be achieved, without extending the length of the tool in a manner similar to the published U.S. patent application Ser. No. 2003/0085707 A1, by Minerbo et al.

Some embodiments of the invention relate to tools having a transmitter sub at a great distance from the receiver (e.g., >90 ft) to allow selective sensitivity to reservoir complexity. Such an embodiment may have an independently powered transmitter sub placed outside (far away from) a conventional bottom hole assembly.

Some embodiments of the invention relate to placement of a transmitter at or inside the drill bit, or very close to the drill bit, for look-ahead capability. Such an embodiment may have an independently powered system and data communication capability.

Some embodiments of the invention relate to having at least one module located in a separate well or borehole Some embodiments of the invention relate to methods of formation resistivity evaluation using measurement frequencies tailored to the expected formation. The frequency range, for example, may be up to 200 KHz.

Some embodiments of the invention related to combining modules of the invention with existing LWD resistivity arrays.

Some embodiments of the invention relate to coil designs that have multiple windings to permit the use of the same antenna for a wide range of frequencies. The multiple windings may be connected in series or parallel.

Some embodiments of the invention related to extension of the amplitude measurement to phase, relative phase and amplitude as well as phase shift and attenuation (propagation) that requires a sub to include two receiver antennas with relatively long spacing in the ten feet range.

Some embodiments of the invention relate to implementation of directional antennas (co-located or in close proximity) with or without metallic shields.

Tool Modularity

Some embodiments of the invention relate to resistivity arrays having modular designs. As used herein, a "resistivity array" is a configuration that includes at least one receiver module and at least one transmitter module attached at different locations on a drill string. The modular design allows the transmitter and receiver antennas to be placed at various locations within a BHA, or at locations in the drill string above the BHA. For example, FIG. 2 shows a resistivity array including four transmitter modules 21, 22, 23, 24 and one receiver module 25 placed among other LWD or MWD tools 27, 28, 29, 30 in a BHA. By inserting transmitter and/or receiver modules at different locations on a standard BHA, as shown in FIG. 2, or a drill string, specific depths of investigation can be implemented to optimize the formation model inversion process that uses such deep resistivity measurements. For example, in one embodiment, transmitter module 21 may be about 90 to 100 feet from receiver module 25. In addition, one or more module may be placed in a nearby borehole to provide a large spacing array.

The above-mentioned '985 application discloses an ultra-deep resistivity array that may include transmitter and receiver modules. The '985 application discusses the relationship between depth of investigation ("DOI") and the spacing between a transmitter and a corresponding receiver antenna, the relationship being that greater spacing results in a corresponding increase in DOI. The present inventors have found that the relationship holds true; however, increasing the spacing complicates the ability for a receiver to pickup and couple the signals from a transmitter. Embodiments of the present invention may use a tri-axial antenna in a transmitter or receiver module, wherein the tri-axial antenna module has three antennas having magnetic moments in three different directions. The tri-axial antenna module will ensure that at least some of the transverse components of the tri-axial antenna can form substantial coupling with the transverse component of a corresponding transmitter or receiver. The use of a tri-axial antenna transceiver (or receiver) is advantageous because when the drill string is made up, it would be difficult to ensure that a single antenna transmitter will align with a single antenna receiver, with that difficulty increasing as the spacing increases. In contrast, the tri-axial antenna transceiver (or receiver) will always have a component substantially aligned with the magnetic moment of a corresponding receiver (or transceiver) in the resistivity array. In addition, tri-axial allows the determination of formation characteristics such as dip angle, anisotropy, shoulder bed effects.

Figure 4:
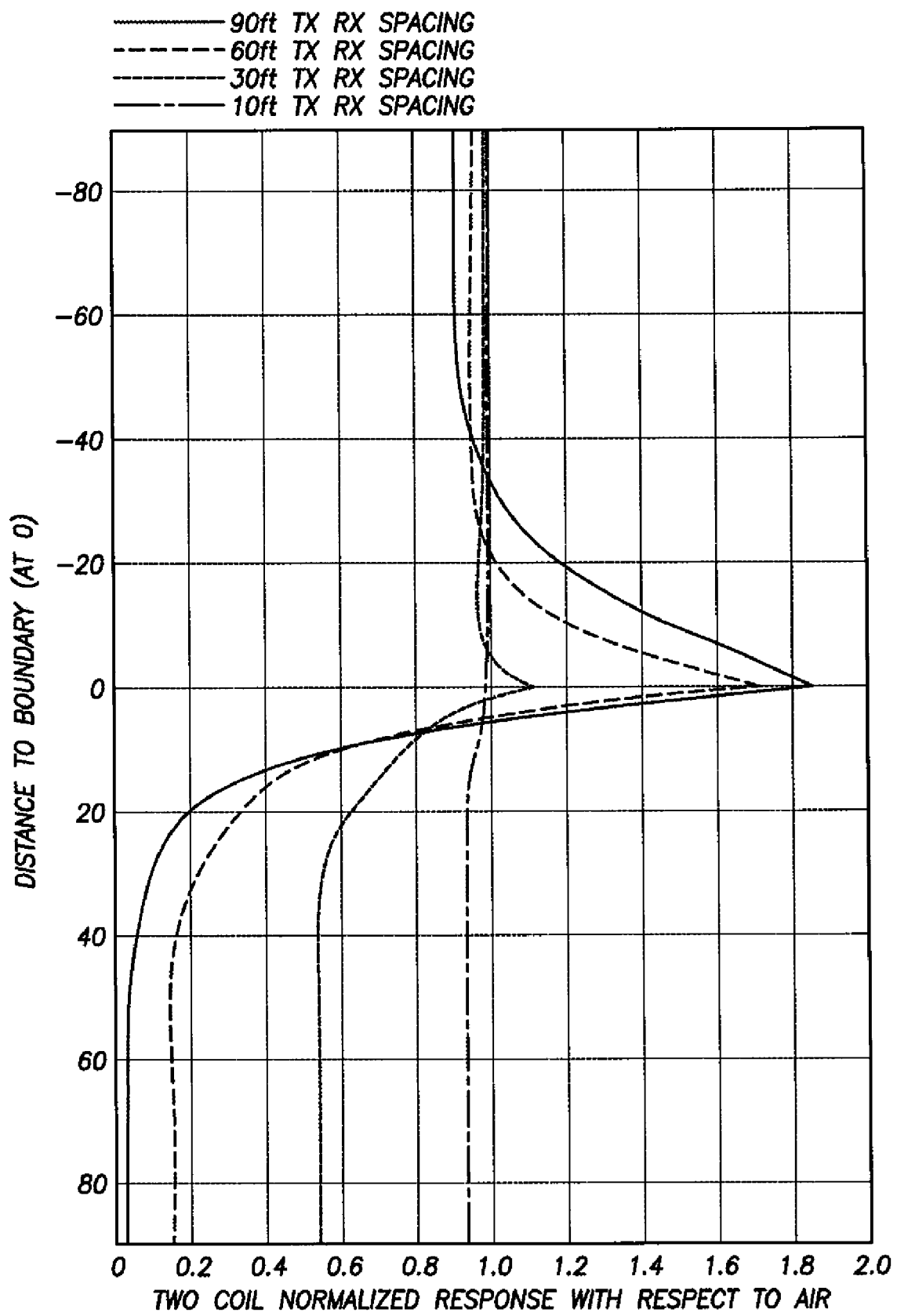
FIG. 4 shows examples of depth of investigation for a 10 kHz amplitude measurement obtained with various transmitter-receiver distances in accordance with one embodiment of the present invention.

FIG. 4 shows examples of depth of investigation for a 10 kHz amplitude measurement obtained with transmitter-receiver distances of 10, 30, 60 and 90 ft in the presence of a boundary with resistivity contrast of 1 to 10 ohms. The drill string (hence the resistivity array) is assumed parallel to the boundary and at various distances away from the boundary. As shown in FIG. 4, the 10 ft array is not very sensitive to the boundary; it shows only a slight magnitude changes in the vicinity of the boundary. The 30 ft array is more sensitive, showing a distinct transition at the boundary. The 60 ft array is even more sensitive; it shows very pronounced resistivity transition around the boundary. At this transmitter-receiver spacing, the signal magnitude starts to change at about 20-40 ft away from the boundary. With the 90 ft array, the signal magnitude change is even more profound. It is apparent that combination of different depths of investigation allows differentiations of geological formation at different radial distance. The modular design makes it easy to configure the tools for different array spacing. Further, the use of one or more tri-axial antennas as transmitters and/or receivers increases the spacing that may be achieved, which provides a corresponding increase in DOI.

Modular Subs as Transceivers

Some embodiments of the invention relate to resistivity array designs having transceiver antennas. In these tools, the antennas are not designed as separate transmitters or receivers. Instead, the same antenna can function as either a transmitter or a receiver. Such enhancement, besides being economically advantageous, allows more depth of investigation for the same number of subs, as illustrated in FIG. 3.

FIG. 3 shows a tool assembly 40 having three subs 41, 42, 43 that form two arrays with spacing of D and Dx2. Because the antennas 41 and 43 can function as a transmitter or a receiver, a third array having a spacing of Dx3 is also available with this tool configuration. Moreover, with the transceiver antennas, directional measurements can also be performed without having to have both transmitter and receiver belonging to a common downhole tool. For example, a set of symmetrized measurements may be obtained first with antenna 41 as the transmitter and antenna 43 as the receiver, then with antenna 43 as the transmitter and antenna 41 as the receiver.

Remote Subs as Transmitter/Transceivers

Some embodiments of the invention relate to tools having antenna subs placed far from other BHA tools (e.g., the receivers or transmitters). Wells often have curves and bends that limit the practical length of a BHA. Thus, conventional resistivity tools cannot have transmitters and receivers spaced farther than the practical length limit of the BHA (about 150 feet). Such tools cannot provide the depth of investigation that might be needed when placing a well path within a reservoir with a thickness that exceeds the maximum practical length of a standard drilling tool assembly.

FIG. 5 shows a resistivity array incorporating a remote sub in accordance with one embodiment of the invention. As shown, the resistivity array includes a conventional UDR 51 in the BHA. The UDR includes three antennas (transmitters, receivers, or transceivers) 52, 53, 54. Further up the drill string, the resistivity array also includes a remote module 55, which includes a transmitter, a receiver, or a transceiver. The antenna in the remote module 55 may be used with any of the antennas 52, 53, 54 to form an array having a large spacing. By using a remote module 55 with other conventional resistivity tools in the BHA, transmitter-receiver distances (i.e., array spacing) can be set to any desired distance. The remote module 55 may be independently powered. Furthermore, the remote module 55 may be operated by wireless telemetry, for example. In one embodiment, one or more drill collars 63 may be located between the remote module 55 and one or more of the antennas 52, 53, 54.

The location of the remote module 55 may be selected to be on the order of (or greater than) the reservoir thickness. Having an array spacing on the order of (or greater than) the reservoir thickness can provide distinct advantages that are otherwise unavailable to conventional resistivity tools.

Figure 7A:
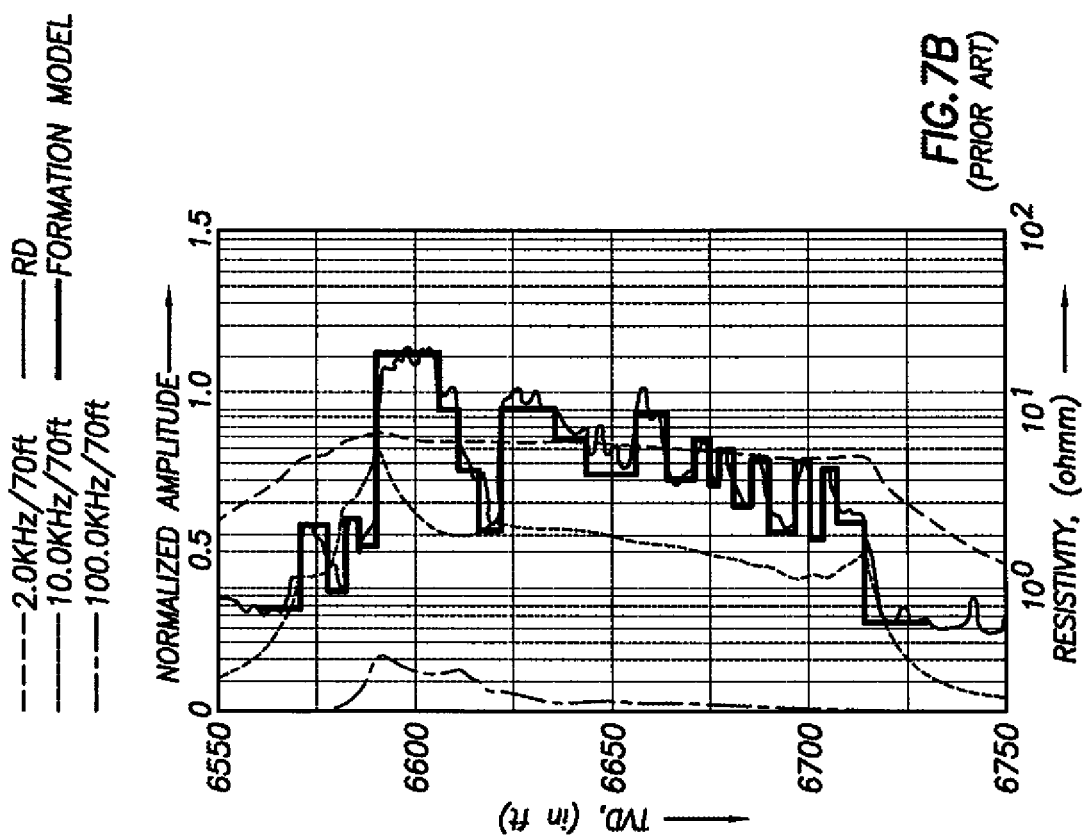
FIGS. 7A and 7B show amplitude responses of conventional prior art resistivity arrays.
Figure 7B:
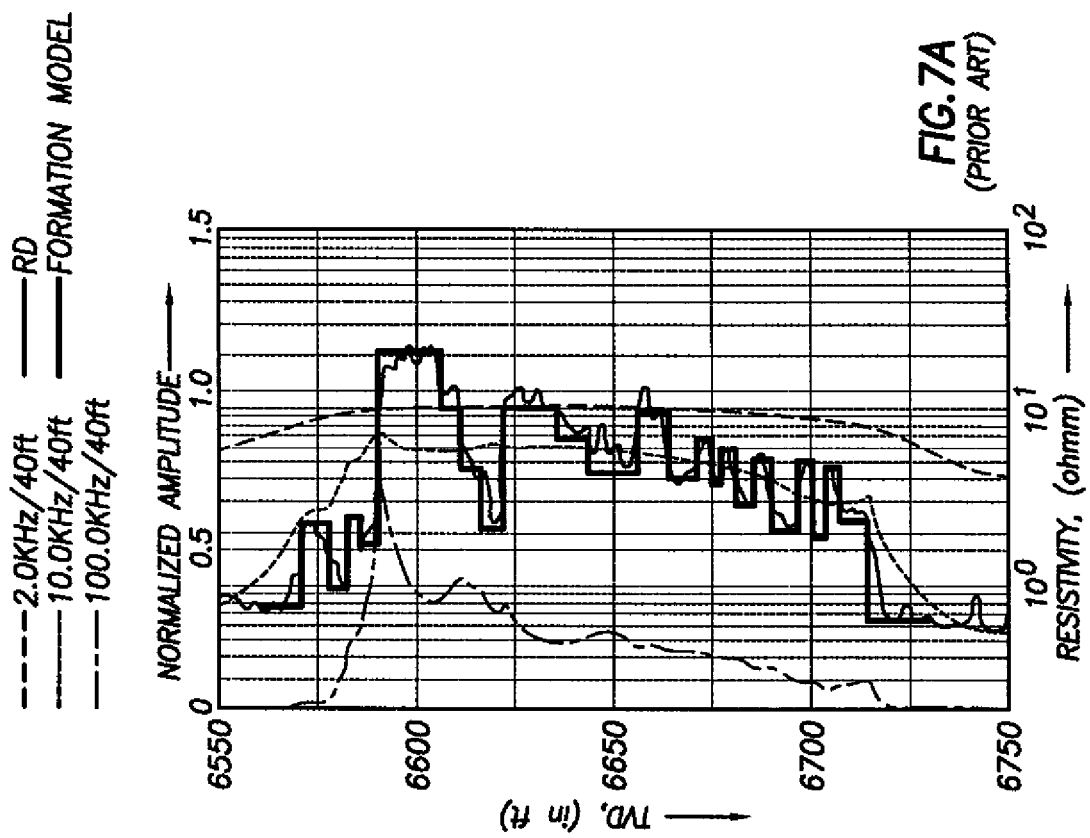
Figure 7D:
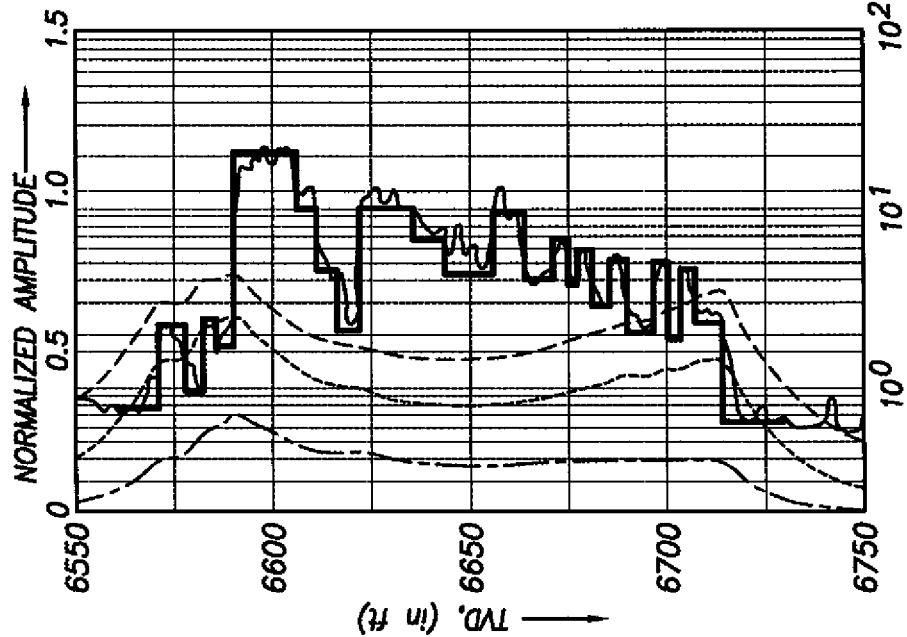
FIGS. 7C and 7D show amplitude responses of resistivity arrays in accordance with one embodiment of the present invention.
Figure 7C:
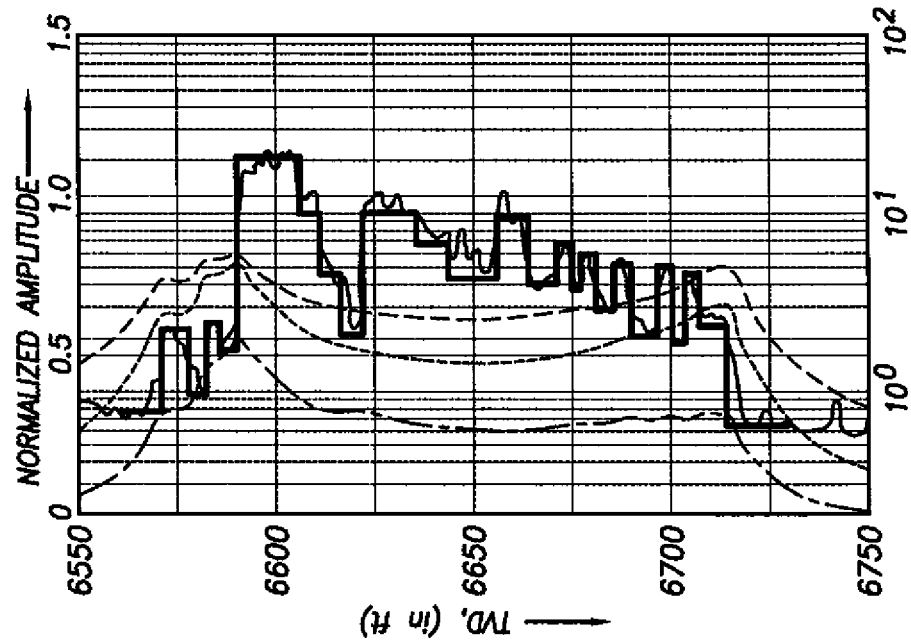

For example, FIGS. 7C and 7D show that the amplitude responses of the long array (the spacing of which is on the order of the bed thickness, 130 ft) are much simpler and clearly indicate where the bed boundaries are. The responses of this extra long array (especially at low frequencies) are not sensitive to the reservoir internal complexity. In contrast, as shown in FIGS. 7A and 7B, the amplitude responses of conventional prior art resistivity arrays (the spacing of which are smaller than the bed thickness, 130 ft) are more sensitive to resistivity variations within the bed, but less sensitive to bed boundaries. Results from FIGS. 7A-7D show that sensor distances (array spacing) and operational frequencies may be advantageously selected based on the properties of the reservoir being drilled, for example, the expected bed thickness or the ratio of the lowest reservoir layer resistivity and the resistivity of the cap and reservoir bottom.

Look-Ahead with Subs at the Bit

Some embodiments of the invention relate to resistivity tools having look-ahead ability. In accordance with embodiments of the invention, a sub may be placed proximate the drill bit in a way similar to that described in U.S. Pat. No. 6,057,784 issued to Schaff et al., and assigned to the assignee of the present invention. That patent is incorporated herein by reference in its entirety. In addition, an antenna can also be placed on a rotary steerable tool or directly inside a bit. By placing a transceiver at the bit, the resistivity measure point taken at the mid-distance between each transmitter/receiver pair is moved closer to the bit, thus allowing faster reaction time while drilling. This ability allows earlier real-time action to be taken to place the well based on geological events. Moreover, look-ahead of the bit is also possible by using the tool response tail that extends beyond a resistivity sensor pair.

FIG. 6 shows one example of a resistivity array in accordance with one embodiment of the invention. As shown, the resistivity tool 70 comprises a drill bit 14 at one end of the drill string. An antenna 73 (which may be a transmitter or a receiver antenna) is disposed on the drill string proximate the drill bit 14. In addition, the resistivity array includes a UDR 51 having three transceiver modules 52, 53, 34, which can function as receivers or transmitters. While three transceiver modules are shown in this example, one of ordinary skill in the art would appreciate that such a tool may have more or less transceiver modules. Further, receiver or transmitter modules may replace one or more of the transceiver modules. In one embodiment, antenna 73 may be a component of drill bit 14.

In accordance with some embodiments of the invention, the near-bit antenna 73 has a non-longitudinal magnetic moment, i.e., the magnetic moment of the antenna 73 is not in a direction parallel with the drill string axis. The non-longitudinal magnetic moment of the antenna 73 ensures that the antenna 73 has a component of the magnetic moment in the transverse direction (i.e., the direction perpendicular to the drill string axis). In addition, at least one of the transceiver modules (e.g., 52, 53, 54) comprises a tri-axial antenna, in which three antennas have magnetic moments in three different orientations. In some cases, the tri-axial antennas may have magnetic moments in three orthogonal orientations. The tri-axial antenna module will ensure that at least some of the transverse components of the tri-axial antenna can form substantial coupling with the transverse component of the near-bit antenna 73. The near-bit antenna 73 may be a transmitter, receiver, or a transceiver. In general, it is preferable for the near-bit antenna 73 to be a transmitter because a receiver antenna may see higher electrical noise from increase vibration and shock or from a possible presence of a high power rotary steerable tool. As a result, the motor assembly 16, which may include powered steering components, can disrupt a receiver antenna.

Multi-Frequency Measurement

Some embodiments of the invention relate to tools and methods that use multi-frequencies for resistivity measurements. In accordance with embodiments of the invention, frequencies may be selected to more efficiently cover the frequency spectrum in order to improve the inversion accuracy and flexibility of deep resistivity measurements. For example, in accordance with some embodiments of the invention, measurements may be acquired with a distribution of 3 or more frequencies per decade. These frequencies can be set or automatically selected, either before drilling or while drilling, to provide optimal formation inversion. The combination of transmitter receiver distance with frequency is integral in the determination of reservoir outer boundaries with complex internal layer. The combination of antenna spacing and frequency are preferably selected to respect the following equation for maximum sensitivity.

Let's define propagation coefficient k as: $k^2 = \epsilon\mu\omega^2 + i\sigma\mu\omega$, where $\epsilon$ is the electromagnetic permittivity, $\mu$ electromagnetic permeability, $\sigma$ conductivity, and $\omega$ the angular frequency. If L represents the Transmitter-Receiver spacing, then we want: |k|.L∈[0.1;10]. The frequencies are preferably chosen to meet this criterion.

Figure 8:
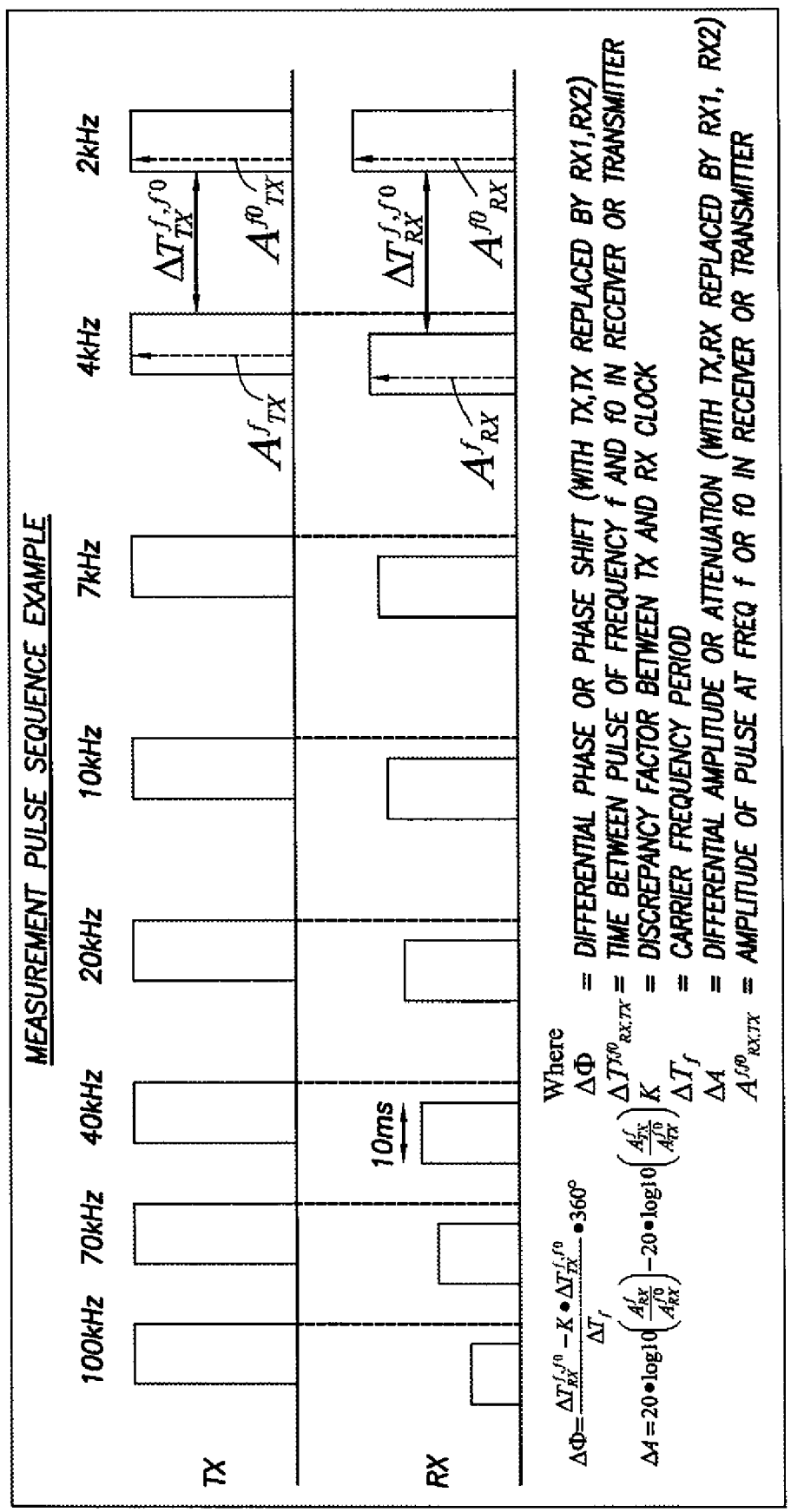
FIG. 8 shows a sequencing method in accordance with one embodiment of the present invention.

The multi-frequency measurements can be efficiently performed using any implementation scheme known in the art. For example, FIG. 8 shows an example of a resistivity measurement sequence for multi-frequency measurement. In the scheme shown in FIG. 8, all TX pulses are assumed to have a controlled amplitude. Furthermore, one of ordinary skill in the art would appreciate that in the pulse scheme, as shown in FIG. 8, a single pulse may be implemented to carry two or more frequencies. Signal measurements may be performed by measuring the true voltages as sensed by the receivers. Alternatively, the signals may be measured as differential signals between a pair of pulses of different frequencies.

Combination of Subs with Existing LWD Tools

Figure 9:
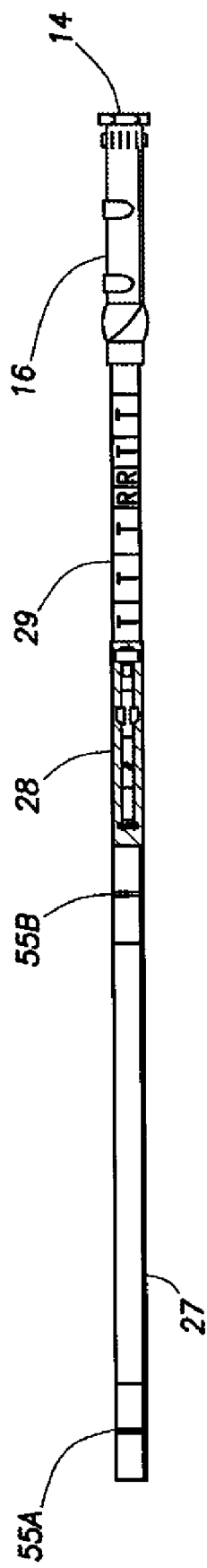
FIG. 9 shows a resistivity array in accordance with one embodiment of the present invention.

Some embodiments of the invention relate to resistivity arrays having remote subs, as described above, with other conventional resistivity tools. For example, FIG. 9 shows a tool including two remote sub transmitters, 55A and 55B, and a conventional LWD resistivity tool that may function as receivers for the remote transmitter modules to provide arrays with spacing much longer than what is possible with conventional resistivity arrays. One of ordinary skill in the art would appreciate that any conventional resistivity tool having one or more antennas for receiving resistivity signals may be used in combination with remote sub transmitters as disclosed herein. The option of running transmitter modules in combination with an existing "shallow" LWD tool (using their resistivity antennas as deep resistivity receivers) allows asset rationalization and integrated measurement capabilities.

Multi-Winding Antenna

Some embodiments of the invention relate to antennas that may be used efficiently in a wide frequency range. When an antenna is used to transmit a resistivity signal at a certain frequency, the antenna is most efficient when the frequency is below the self-resonance frequency of the antenna. Therefore, when a particular antenna is used in a wide frequency range, the antenna may not be efficient in certain frequency ranges. For example, to transmit at the highest frequency, the number of turns in the antenna should be low enough to be below the coil self resonance. On the other hand, to be optimum in transmission at a lower frequency, the number of turns needs to be increased. As a result, conventional antennas often have windings that represent a compromise for the intended operational frequency range.

In accordance with some embodiments of the invention, an antenna may have several layers of windings; each of the layers may be either wired in parallel for high frequency or in series for a lower frequency to efficiently balance the impedance load of the antenna when driven with a constant voltage. The switching between serial and parallel configurations may be controlled electronically.

Figure 10:
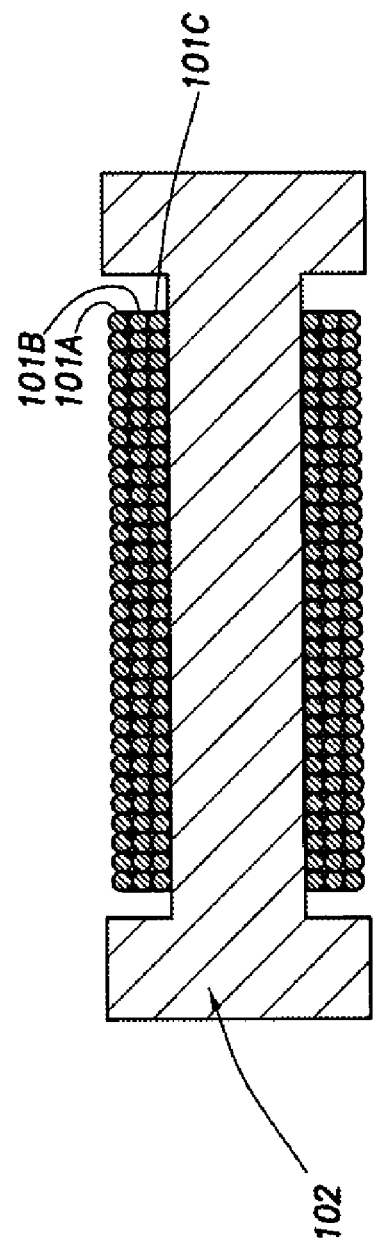
FIG. 10 shows an antenna module in accordance with one embodiment of the present invention.

FIG. 10 shows an exemplary antenna in accordance with one embodiment of the invention. Coil layers 101A-101C, in this example, are either connected in series to maximize the number of turns in the transmission at low frequency (for example, around 1 kHz range), or are connected in parallel for the higher frequency range (for example, 100 kHz). The coil layers 101A-101C are wrapped around a mandrel 102. One of ordinary skill in the art would appreciate that several layers of coils may be used in an antenna to provide finer tuning of the performance of the antenna.

Extension to Other Resistivity Measurement Techniques

Conventional deep resistivity measurements, such as that disclosed in U.S. Pat. No. 6,188,222, are based on induction mechanism and measures signal amplitudes, not phase or phase shifts or attenuations. Some embodiments of the invention relate to deep resistivity measurements based on propagation mechanism and measure phase shifts and attenuations (i.e., differential measurements), by introducing an extra receiver antenna with a spacing between the receiver pair on the order of 5 to 10 feet, which is significantly longer than the receiver pair spacing (typically limited to less than a foot) in a conventional propagation tool. The longer spacing between the receiver pair is desirable because of the lower frequencies used for deep EM measurement (1 to 200 kHz). A spacing between the receiver pairs on the order of 5 to 10 feet would ensure that the minimum phase shift that can be measured stays in the ~0.1 degree range.

In addition to using a receiver pair, differential measurements in phase and amplitude (i.e., phase shifts and attenuations) may also be performed with a proper pulse scheme, such as that shown in FIG. 8. The measurement scheme shown in FIG. 8 may use one (or more) of the transmitted pulses at a specific frequency as a time reference. Assuming a constant phase reference (or time difference) between pulses in the pulse train (this time difference can also be measured and communicated to the receiver via wireless telemetry), the phase reference (or time difference) for the received pulse trains can be determined with respect to the reference pulse.

The same technique (using the amplitude of a reference pulse for comparison) can also be applied to the amplitude ratio between each pulse in the pulse train and the reference pulse. In this case, the amplitude ratio at the transmitter may be kept constant or measured. The difference technique in pulse time of arrival and amplitude ratio reduces the dependence of the measurement on an accurate air calibration as needed for the amplitude measurement.

As an example, FIGS. 11A-11F show various measurements for a planar boundary with resistivity contrast of 1 and 100 ohms, using a tool having a transmitter-receiver spacing of 70 feet. This tool has transmitter and receiver antennas that have longitudinal magnetic moments (i.e., magnetic moments in a direction parallel with the longitudinal axis of the tool).

Figure 11A:
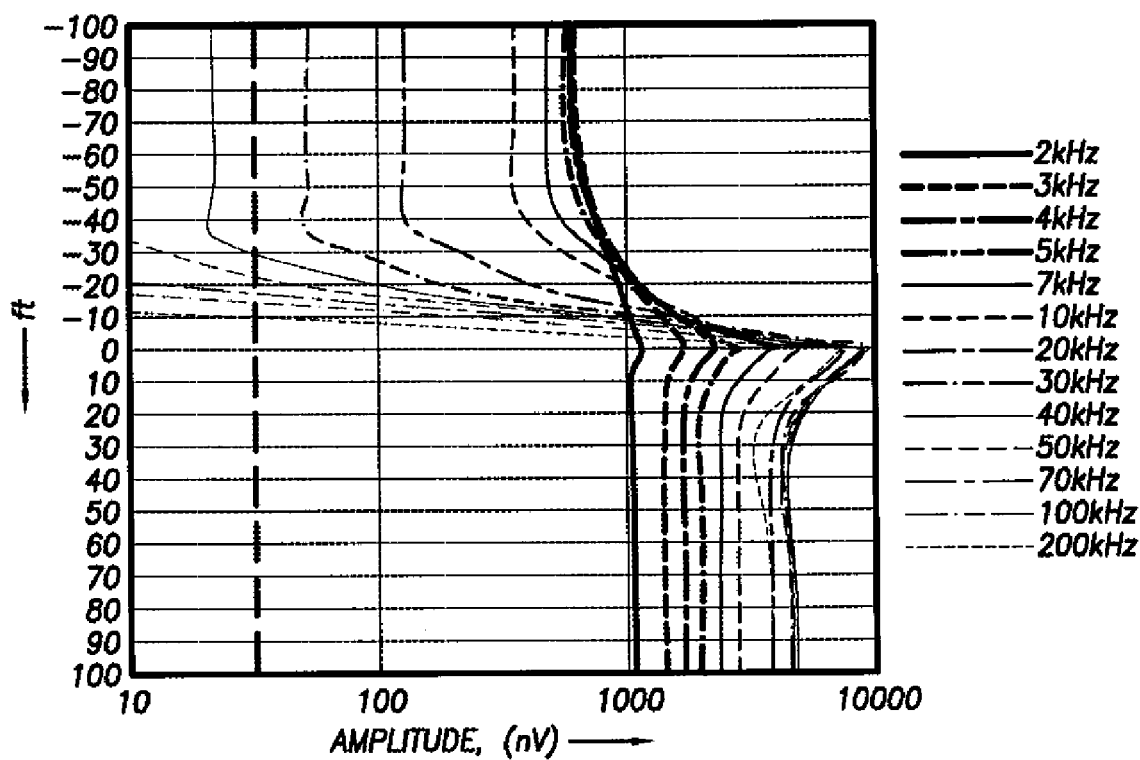
FIGS. 11A-11F show various measurements for a planar boundary with resistivity contrast according to one embodiment of the invention.
Figure 11B:
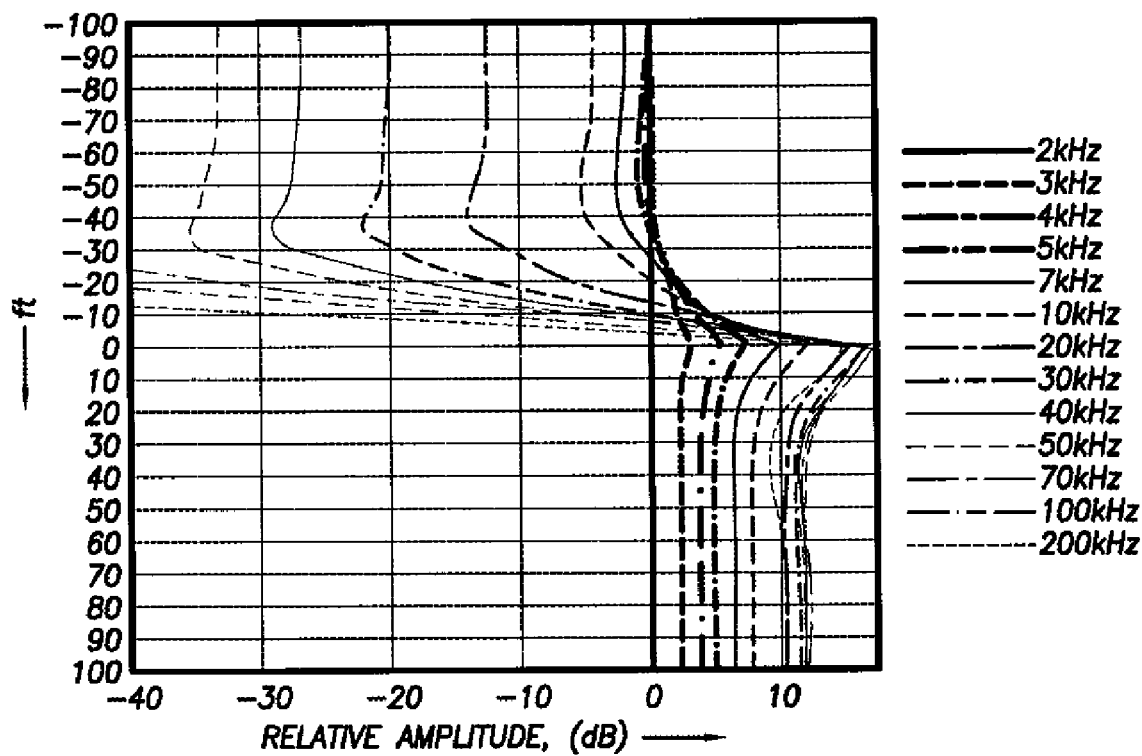
Figure 11C:
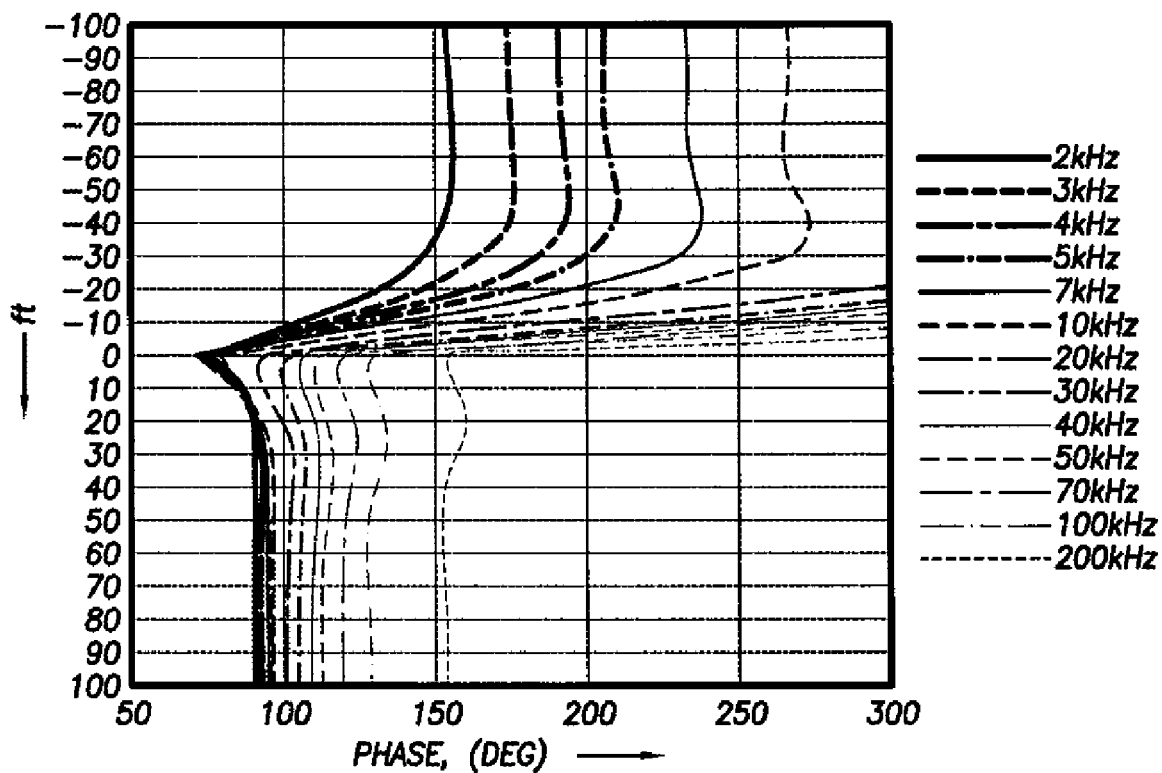
Figure 11D:
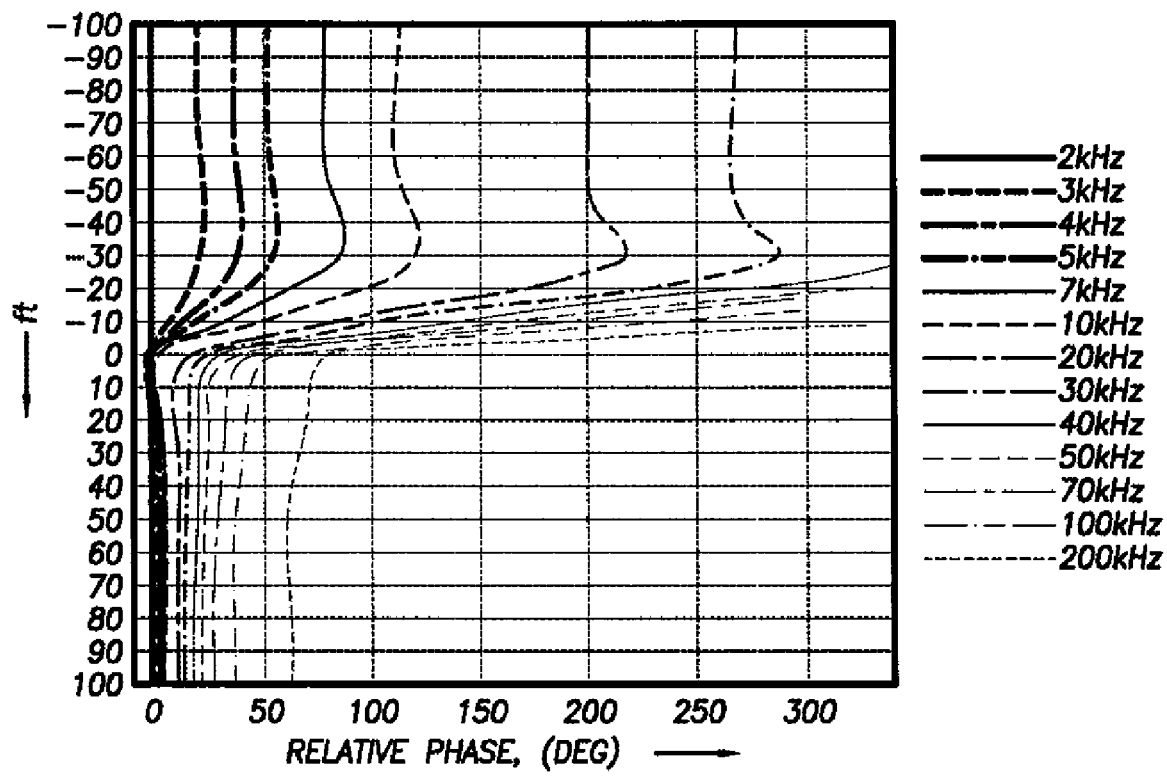

FIG. 11A and FIG. 11B show amplitude measurements and relative amplitude measurements, respectively, at various frequencies. In FIG. 11B, the relative amplitude measurements are with respect to the amplitude measurement at 2 KHz. FIG. 11C and FIG. 11D show phase measurements and relative phase measurements, respectively, at various frequencies. In FIG. 11D, the relative phase measurements are with respect to the phase measurement at 2 KHz.

Figure 11E:
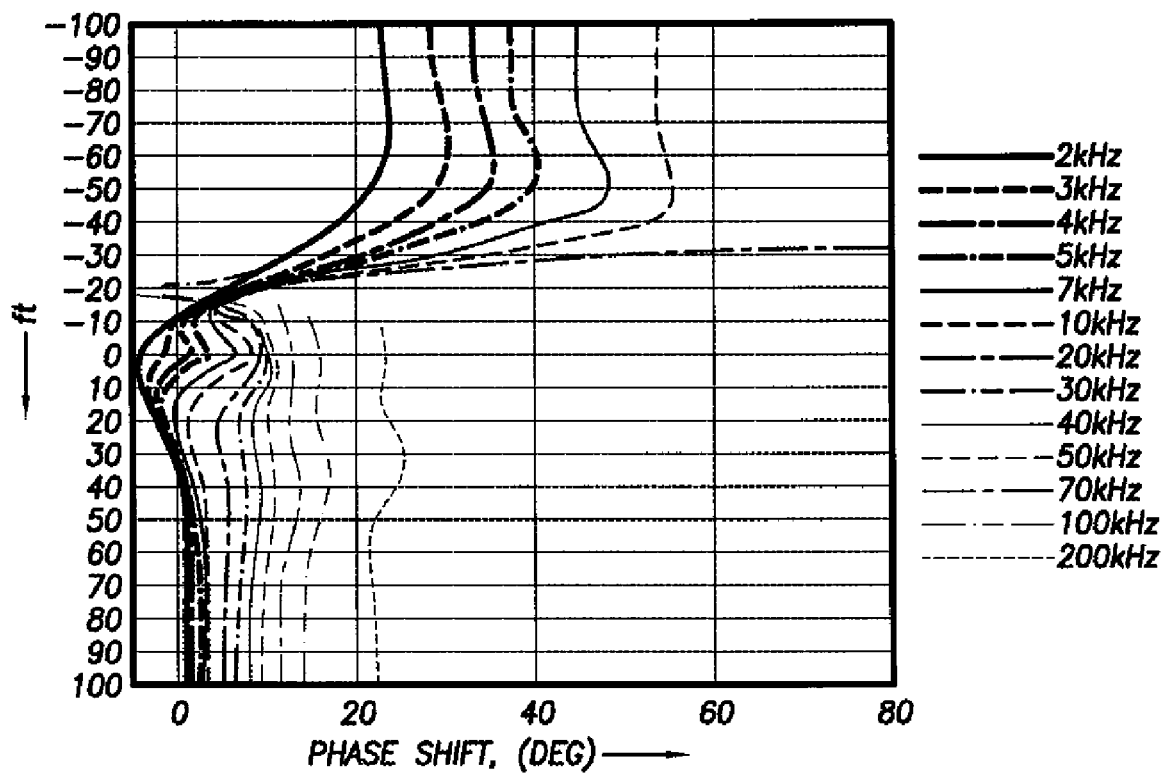
Figure 11F:
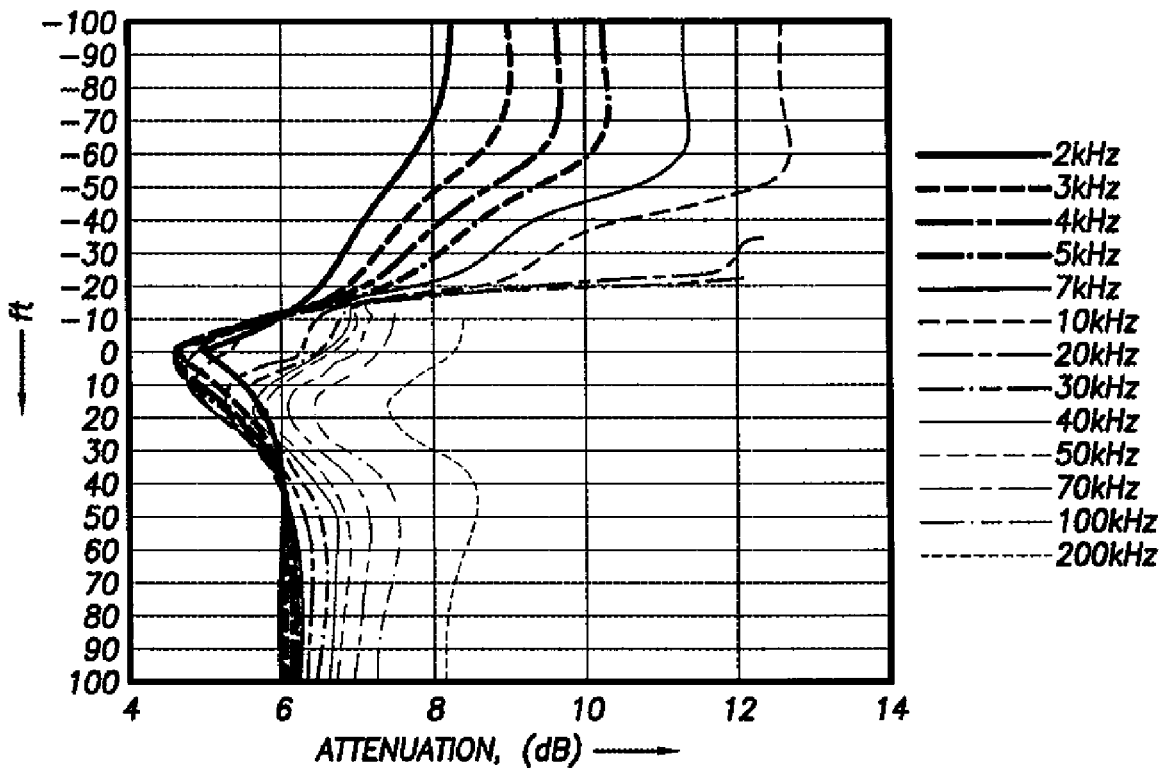
Figure 12:
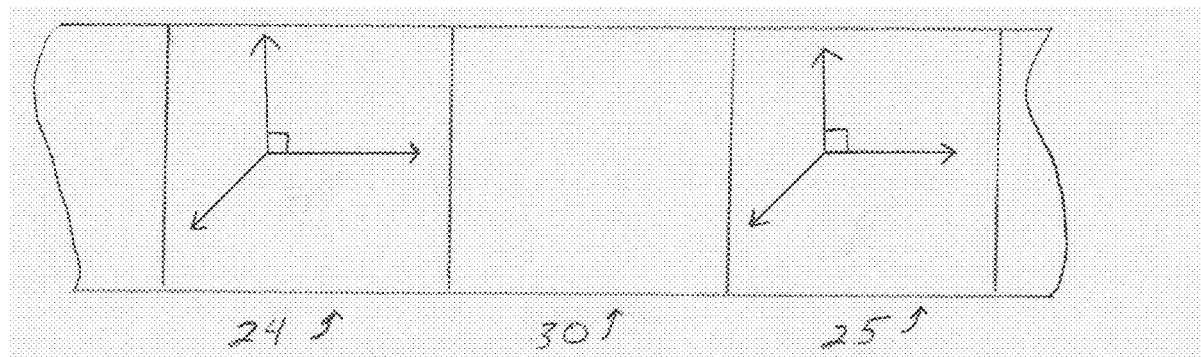
FIG. 12 shows an enlarged view of two of the modules of the resistivity away shown in FIG. 2, wherein a dipole moment of one of the antennas of one of the modules intersects the longitudinal axis of that module at 90 degrees, and a dipole moment of one of the antennas of the other module intersects the longitudinal axis of that module at 90 degrees.
Figure 13:
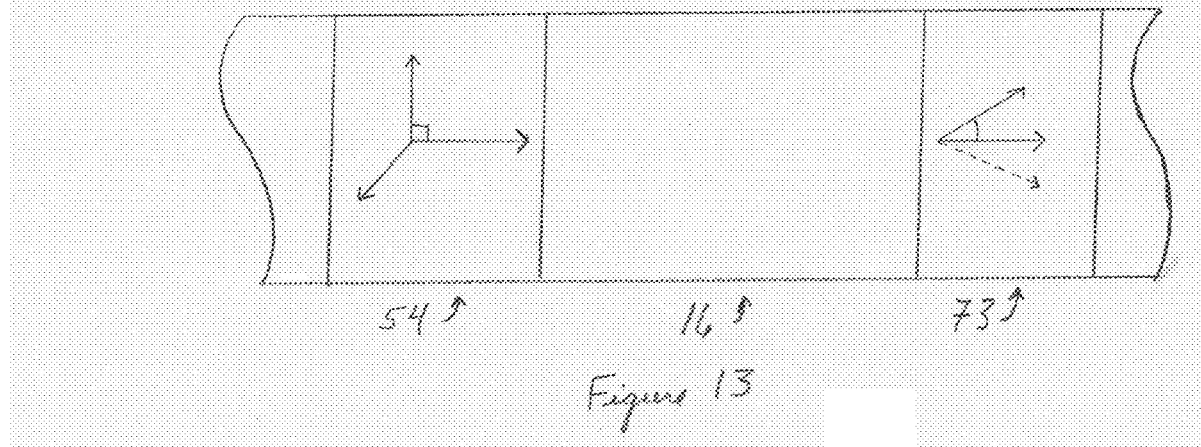
FIG. 13 shows an enlarged view of two of the modules of the resistivity away shown in FIG. 6, wherein a dipole moment of one of the antennas of one of the modules intersects the longitudinal axis of that module at 90 degrees, and a dipole moment of one of the antennas of the other module intersects the longitudinal axis of that module at an angle not equal to 90 degrees.

FIG. 11E and FIG. 11F show phase shift measurements and attenuations, respectively, at various frequencies, as measured with a pair receivers having an 8 feet spacing. With such a spacing, significant variations in Phase Shift and Attenuation can be readily observed. Both measurement provide another set of measurements with a different sensitivity allowing more independent measurements to be used during the inversion process.

Some embodiments of the invention relate to geo-steering. A method of geo-steering in accordance with embodiments of the invention may use any resistivity array described above and/or using a measurement method described above (e.g., multi-frequency measurements, use of a pulse schemes, etc.).

All measurements with the above-described embodiments of the invention can be extended to directional measurements. Directional measurements allow further sensitivity to the boundaries and will improve the inversion process accordingly. In some embodiments, the antenna(s) would have a transverse magnetic dipole combined with a normal "axial" antenna to provide both measurements from the same antenna. In a tri-axial antenna, as discussed above, one portion may be aligned with the axis of the BHA, while the other two portions are at angles relative thereto. Conventional shields can also be implemented with embodiments of the invention as desired. It will be appreciated that the antennas (and related electronics) of the embodiments of the invention may be implemented using one of many well-known antenna designs and packaging schemes. For example, the logging apparatus described in U.S. Pat. No. 6,188,222 may be used to implement the present invention.

While the above description uses logging-while-drilling tools to illustrate various embodiments of the invention, a tool of the invention is not limited by any particular mode of conveyance. Therefore, a tool of the invention may be used in, for example, logging-while-drilling, logging-while-tripping, coil drilling, logging through the bit, liner drilling, casing drilling operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A modular downhole apparatus to determine a formation property, the apparatus being incorporated into a drill string comprising one or more downhole tools and drill pipe, the drill pipe being of the same or various lengths, the modular downhole apparatus comprising:
   a first module comprising a first drill collar having one or more antennas mounted thereon or therein, wherein the first module has connectors on both ends and is removeably connected to the drill string; and
   a second module comprising a second drill collar having one or more antennas mounted thereon or therein, wherein the second module has connectors on both ends and is removeably connected to the drill string;
   wherein a first dipole moment of one of the one or more antennas of the first module intersects a first module longitudinal axis at a first angle;
   wherein a second dipole moment of one of the one or more antennas of the second module intersects a second module longitudinal axis at a second angle; and
   wherein the first and second angles are equal.

2. The modular downhole apparatus of claim 1, wherein the first and second angles are non-longitudinal.

3. The modular downhole apparatus of claim 2, wherein the first and second dipole moments are azimuthally offset from one another.

4. The modular downhole apparatus of claim 1, wherein one of the modules has an antenna having a third dipole moment that intersects the longitudinal axis of that module at a third angle that is not equal to the first angle.

5. The modular downhole apparatus of claim 1, wherein at least one of the modules comprises a conventional resistivity tool.

6. The modular downhole apparatus of claim 1, wherein one or more of the one or more antennas in one or both of the modules comprises a transceiver.

7. The modular downhole apparatus of claim 1, wherein one or more of the one or more antennas in one of the modules transmits a signal and one or more of the one or more antennas in the other module receives the signal.

8. The modular downhole apparatus of claim 1, wherein the one or more antennas of one or both of the modules comprise transmitter antennas and receiver antennas.

9. The modular downhole apparatus of claim 1, wherein one or more of the one or more antennas of one of the modules is disposed proximate to or within a drill bit.

10. The modular downhole apparatus of claim 1, wherein one of the modules includes a drill bit.

11. The modular downhole apparatus of claim 1, wherein one of the modules is part of a logging-while-drilling resistivity tool.

12. The modular downhole apparatus of claim 1, further comprising one or more additional modules, each additional module having one or more antennas, wherein each additional module has connectors on both ends and is removeably connected to the drill string.

13. The modular downhole apparatus of claim 1, wherein one or more of the one or more antennas in one or both of the modules comprises a solenoid coil approximating a magnetic dipole.

14. The modular downhole apparatus of claim 1, wherein the one or more antennas on the first module comprise a plurality of antennas having dipole moments that intersect the first module longitudinal axis at the first angle, and the one or more antennas on the second module comprise a plurality of antennas having dipole moments that intersect the second module longitudinal axis at the second angle.

15. The modular downhole apparatus of claim 1, wherein the formation property is one or more of a horizontal resistivity, a vertical resistivity, a formation resistivity, a formation factor, a fluid saturation, a dip angle, a dip azimuth angle, a porosity, a distance to bed boundary, a formation conductivity tensor, or a permeability.

16. A modular downhole apparatus to determine a formation property, the apparatus being incorporated into a drill string comprising one or more downhole tools and drill pipe, the drill pipe being of the same or various lengths, the modular downhole apparatus comprising:
   a first module comprising a first drill collar having one or more antennas mounted thereon or therein, wherein the first module has connectors on both ends and is removeably connected to the drill string; and
   a second module comprising a second drill collar having one or more antennas mounted thereon or therein, wherein the second module has connectors on both ends and is removeably connected to the drill string;
   wherein a first dipole moment of one of the one or more antennas of the first module intersects a first module longitudinal axis at a first angle;
   wherein a second dipole moment of one of the one or more antennas of the second module intersects a second module longitudinal axis at a second angle; and
   wherein the first and second angles are unequal.

17. The modular downhole apparatus of claim 16, wherein the first and second angles are non-longitudinal.

18. The modular downhole apparatus of claim 17, wherein the first and second dipole moments are azimuthally offset from one another.

19. The modular downhole apparatus of claim 16, wherein one of the modules has an antenna having a third dipole moment that intersects the longitudinal axis of that module at a third angle that is equal to neither the first angle nor the second angle.

20. The modular downhole apparatus of claim 16, wherein at least one of the modules comprises a conventional resistivity tool.

21. The modular downhole apparatus of claim 16, wherein one or more of the one or more antennas in one or both of the modules comprises a transceiver.

22. The modular downhole apparatus of claim 16, wherein one or more of the one or more antennas in one of the modules transmits a signal and one or more of the one or more antennas in the other module receives the signal.

23. The modular downhole apparatus of claim 16, wherein the one or more antennas of one or both of the modules comprise transmitter antennas and receiver antennas.

24. The modular downhole apparatus of claim 16, wherein one or more of the one or more antennas of one of the modules is disposed proximate to or within a drill bit.

25. The modular downhole apparatus of claim 16, wherein one of the modules includes a drill bit.

26. The modular downhole apparatus of claim 16, wherein one of the modules is part of a logging-while-drilling resistivity tool.

27. The modular downhole apparatus of claim 16, further comprising one or more additional modules, each additional module having one or more antennas, wherein each additional module has connectors on both ends and is removeably connected to the drill string.

28. The modular downhole apparatus of claim 16, wherein one or more of the one or more antennas in one or both of the modules comprises a solenoid coil approximating a magnetic dipole.

29. A method to determine a formation property, the method comprising:
  providing a modular apparatus incorporated into a drill string comprising one or more downhole tools and drill pipe, the drill pipe being of the same or various lengths; the modular apparatus comprising a first module comprising a first drill collar having one or more antennas mounted thereon or therein, wherein the first module has connectors on both ends and is removeably connected to the drill string; a second module comprising a second drill collar having one or more antennas mounted thereon or therein, wherein the second module has connectors on both ends and is removeably connected to the drill string; wherein a first dipole moment of one of the one or more antennas of the first module intersects a first module longitudinal axis at a first angle; a second dipole moment of one of the one or more antennas of the second module intersects a second module longitudinal axis at a second angle; and the first and second angles are equal;
  using the first and second modules to make measurements; and
  using the measurements to determine the formation property.

30. The method of claim 29, further comprising using the formation property to steer a drill bit.

31. A method to determine a formation property, the method comprising:
  providing a modular apparatus incorporated into a drill string comprising one or more downhole tools and drill pipe, the drill pipe being of the same or various lengths; the modular apparatus comprising a first module comprising a first drill collar having one or more antennas mounted thereon or therein, wherein the first module has connectors on both ends and is removeably connected to the drill string; a second module comprising a second drill collar having one or more antennas mounted thereon or therein, wherein the second module has connectors on both ends and is removeably connected to the drill string; wherein a first dipole moment of one of the one or more antennas of the first module intersects a first module longitudinal axis at a first angle; a second dipole moment of one of the one or more antennas of the second module intersects a second module longitudinal axis at a second angle; and the first and second angles are unequal;
  using the first and second modules to make measurements; and
  using the measurements to determine the formation property.

32. The method of claim 31, further comprising using the formation property to steer a drill bit.

* * * * *